(12) United States Patent
Seibold et al.

(10) Patent No.: US 8,492,465 B2
(45) Date of Patent: Jul. 23, 2013

(54) SUBSTITUTED ALKOXYLATED PHENOLS AND BRANCHED SULFATES FOR USE IN EMULSION POLYMER LATEXES

(75) Inventors: Jean M. Seibold, Des Plaines, IL (US); John C. Hutchinson, Chicago, IL (US); Gary R. Luebke, Gurnee, IL (US); Robert A. Krueger, Chicago, IL (US); Jungsik Lee, Wilmette, IL (US)

(73) Assignee: Stepan Company, Northfield, IL (US)

( * ) Notice: Subject to any disclaimer, the term of this patent is extended or adjusted under 35 U.S.C. 154(b) by 359 days.

(21) Appl. No.: 12/243,626

(22) Filed: Oct. 1, 2008

(65) Prior Publication Data
US 2009/0076202 A1 Mar. 19, 2009

Related U.S. Application Data

(63) Continuation of application No. PCT/US2007/008411, filed on Apr. 3, 2007.

(60) Provisional application No. 60/788,665, filed on Apr. 3, 2006, provisional application No. 60/888,730, filed on Feb. 7, 2007.

(51) Int. Cl.
*C08K 5/06* (2006.01)
*C11D 17/00* (2006.01)

(52) U.S. Cl.
USPC ........... 524/141; 524/158; 524/349; 524/350; 524/351

(58) Field of Classification Search
USPC .................. 524/141, 158, 349, 350, 351
See application file for complete search history.

(56) References Cited

U.S. PATENT DOCUMENTS

| | | | |
|---|---|---|---|
| 5,710,347 A * | 1/1998 | Nishibori et al. | 568/725 |
| 6,204,358 B1 * | 3/2001 | Tanaka et al. | 526/336 |
| 6,465,605 B2 * | 10/2002 | Breindel et al. | 528/403 |
| 6,518,354 B1 * | 2/2003 | Suzuki et al. | 524/575 |
| 6,645,605 B2 | 11/2003 | Hammersmith et al. | |
| 2002/0077267 A1 | 6/2002 | Parry et al. | |
| 2005/0265951 A1 | 12/2005 | Yamawaki et al. | |

FOREIGN PATENT DOCUMENTS

| | | |
|---|---|---|
| GB | 2 025 985 | 1/1980 |
| JP | 50013485 A * | 2/1975 |
| SU | 1068039 | 1/1984 |
| WO | WO 99/19436 | 4/1999 |

OTHER PUBLICATIONS

Translation to JP 50013485 (1975).*

* cited by examiner

*Primary Examiner* — Kelechi Egwim
(74) *Attorney, Agent, or Firm* — McAndrews, Held & Malloy, Ltd.

(57) ABSTRACT

The present technology generally relates to emulsion polymer latexes, particularly those used in pressure sensitive adhesives, paints and coatings. Surfactant compositions of the present technology for use in forming at least one emulsion polymer latex comprise at least one branched surfactant, at least one sterically bulky surfactant, or a mixture of branched and sterically bulky surfactants. One preferred surfactant composition comprises at least one alkoxylated polyaryl substituted aromatic compound or at least one alkoxylated polyalkyl substituted aromatic compound. Another preferred surfactant composition comprises a mixture of at least one branched-alkyl sulfate and at least one ethoxylated polystyrylphenol. Another preferred surfactant composition comprises at least one sulfated polystyrylphenol.

17 Claims, 6 Drawing Sheets

Top row illustrates wet-scrub testing with Surfactant A.
Bottom row illustrates wet-scrub testing with Surfactant B.

SUBSTITUTED ALKOXYLATED PHENOLS AND BRANCHED SULFATES FOR USE IN EMULSION POLYMER LATEXES

RELATED APPLICATIONS

This application is a continuation of PCT Application No. PCT/US07/008,411, filed on Apr. 3, 2007, which claims the benefit of U.S. Provisional Application Ser. No. 60/788,665, filed on Apr. 3, 2006, and U.S. Provisional Application Ser. No. 60/888,730, filed on Feb. 7, 2007.

BACKGROUND OF THE INVENTION

In general, producers of coatings, paints, adhesives, and related products have preferred solvent borne systems instead of water borne systems because solvent borne systems allegedly exhibit superiority in properties such as film forming, water resistance, hardness, and freeze-thaw stability. Waterborne systems, however, are more environmentally friendly than solvent borne systems.

Current regulatory trends that seek to reduce the amount of volatile organic components (VOC's) released into the environment are causing a shift in favor of water borne systems. Recent regulations mandating the reduction of VOC's have made it increasingly difficult to achieve desired properties such as block resistance, adhesion, optical clarity, gloss, pigment dispersion, blister resistance, minimum film-forming temperature, and freeze-thaw stability. As a result, even though water borne systems, such as those containing emulsion polymer latexes, are used as alternatives to solvent based systems, there is still a great need for improved emulsion polymer latexes as a component therein. There is also a need for improved water borne systems utilizing such emulsion polymer latexes.

Surfactants play a crucial role in the formation of emulsion polymer latexes. Once the latex has been made, surfactants that remain can be detrimental in subsequent steps of fabrication, or in the final application. Some examples of these deleterious effects are surfactant blooming or surfactant blushing. Surfactant blooming, or blushing, occurs when a film is contacted with water and the surfactant migrates. This can result in the film becoming hazy.

It is also generally thought that too much surfactant typically results in low water resistivity. Problems associated with surfactants may also arise from the post-polymerization mobility of the surfactants. For instance, the surfactant could migrate from the surface of latex particles to the liquid-air interface or from the surface of a formed latex film. Systems are thus needed that minimize the adverse effects of surfactants in water borne emulsion polymer latex applications.

One way in which latex manufacturers address the problems associated with residual surfactants is through the use of low molecular weight polymers that are compatible with latex and act as emulsion stabilizers. Such low molecular weight polymers are typically polyelectrolytes that have molecular weights of between 1000 and 5000 g/mole and acid values between 140 and 300 mg KOH/g.

Other attempts to minimize the adverse effects of surfactants in emulsion polymer applications have resulted in surfactants that are designed to incorporate within latex through covalent bonds, or through a combination of covalent and ionic interactions. Such polymerizable surfactants include surfmers and non-migrating surfactants.

Current methods of attempting to mitigate the problems associated with residual surfactants, such as those described above, can present difficulties in handling and formulation. There remains a need for alternative environmentally friendly systems that mitigate the problems associated with surfactants due to the post-polymerization mobility of the surfactants while providing increased water resistance and improvements in block resistance, adhesion, optical clarity, and freeze-thaw stability.

BRIEF SUMMARY OF THE INVENTION

The presently described technology relates to surfactant compositions for use in emulsion polymer latexes used in coatings, paints, adhesives and other related products. In some preferred embodiments, surfactant compositions of the present technology can be used in low glass transition temperature emulsion polymer latexes, such as those used in pressure sensitive adhesives (PSAs). In other embodiments, surfactant compositions of the present technology can be used in high glass transition temperature emulsion polymer latexes, such as those used in coating compositions and other compositions employing surfactants.

At least one aspect of the presently described technology provides increases in water resistance and other properties related to the surface activity of residual surfactant in waterborne emulsion polymer systems, such as adhesion, peel strength, opacification resistance, block resistance, gloss, pigment dispersion, minimum film-forming temperature, and blister resistance. With respect to emulsion polymer latexes used in pressure sensitive adhesives, improved water resistance can be measured, for example, through enhanced optical clarity upon exposure to water and through increases in contact angle. In other aspects, the present technology can be used to enhance block resistance, gloss, pigment dispersion, minimum film-forming temperature, and blister resistance in coatings.

Additional aspects of the present technology relate to a surfactant composition for use in forming an emulsion polymer latex. In some embodiments, the surfactant composition comprises at least one surfactant comprising a branched surfactant, a sterically bulky surfactant, or a mixture of branched and sterically bulky surfactants. In other embodiments, the surfactant composition for use in forming emulsion polymer latex of the present technology comprises at least one alkoxylated polyaryl substituted aromatic compound or at least one alkoxylated polyalkyl substituted aromatic compound. In still further embodiments of this aspect of the presently described technology there is provided a surfactant composition for use in forming an emulsion polymer latex comprises a mixture comprising at least one branched ionic surfactant and at least one sterically bulky nonionic surfactant.

Moreover, other aspects of the present technology relate to a composition for forming an emulsion polymer latex that can comprise greater than about 0.01 weight percent to about 7.5 weight percent based on the monomer content of at least one ionic surfactant, and greater than about 0.01 weight percent to about 7.5 weight percent based on the monomer content of at least one nonionic surfactant. Alternatively, the emulsion polymer latex can comprise greater than about 0.01 weight percent to about 5.0 weight percent based on the monomer content of at least one ionic surfactant, and greater than about 0.01 weight percent to about 5.0 weight percent based on the monomer content of at least one nonionic surfactant. In at least one embodiment of this aspect of the present technology, the composition for forming an emulsion polymer latex comprises at least one branched alkyl sulfate such as a sulfated $C_{12}$ alcohol, and at least one ethoxylated polystyrylphenol such as an ethoxylated tristyrylphenol.

Further aspects of the present technology relate to emulsion polymer latexes. A preferred emulsion polymer latex is formed from a composition containing a surfactant composition comprising ethoxylated tristyrylphenol. Another preferred emulsion polymer latex is formed from a composition containing a surfactant composition comprising a mixture of at least one branched alkyl sulfate and at least one ethoxylated tristyrylphenol. A separate preferred emulsion polymer latex is formed from a composition containing a surfactant composition containing at least one sulfated tristyrylphenol. In at least one embodiment, the present technology involves a paint composition (e.g., a dry paint film (i.e., a film as described, for example, by ASTM method D 2486) (7 days storage of paint at about 25° C. and 50% humidity)) that is substantially free of linear surfactants and exhibits improved adhesion and blister resistance. Such a paint composition includes at least one latex composition comprising at least one branched surfactant, polystyrylphenol surfactant or derivative thereof, or mixtures thereof.

Still further aspects of the present technology relate to pressure sensitive adhesives. In some embodiments of this aspect of the presently described technology there is provided a pressure sensitive adhesive having a glass transition temperature less than about (−)15° C., alternatively about 5° C. or less, which is formed from an emulsion polymer latex formed from a composition containing a surfactant composition comprising a mixture of at least one branched-alkyl sulfate and at least one ethoxylated polystyrylphenol. In a preferred embodiment, the pressure sensitive adhesive has a glass transition temperature between about (−) 60° C. and about (−) 40° C. Thus, one of skill in the art will appreciate that the glass transition temperature of an emulsion polymer latex of the present technology as used in pressure sensitive adhesives would be about 30° C. to about 70° C. below the intended use temperature.

Other aspects of the present technology relate to coatings made with latexes. In some embodiments of this aspect of the presently described technology, there is provided a painting composition or coating which contains at least one latex formed from a composition containing a surfactant composition comprising at least a branched surfactant such as branched alkyl-sulfate, a polystyrylphenol-based surfactant such as ethoxylated tristyrylphenol sulfate, or a combination thereof.

Further details and embodiments are disclosed in the discussion of the detailed description below.

DETAILED DESCRIPTION OF THE INVENTION

The presently described technology is distinct from polymerizable surfactants such as surfmers and nonmigrating surfactants in that the surfactants are not covalently or ionically bound to the polymer. The surfactants of the present technology do not rely on a contained (i.e., covalently or ionically bound) reactive moiety. Thus, surfactants of the present technology may present fewer difficulties in handling, and can be cheaper than polymerizable surfactants. Latexes made using the present technology can also be easier to formulate since the surface activity of the included surfactants is attenuated and less likely to interfere with surfactants added for other purposes, such as dispersion aids, rheology modifiers, low and leveling agents, anti-foaming agents, freeze-thaw and calcium ion stabilizers, and other additives with surface activity.

Surfactant compositions of the present technology can be used in applications that are affected by surfactant migration. One example of such an application is in the area of clear pressure-sensitive adhesives. Pressure-sensitive adhesive systems are adhesives that are aggressively and permanently tacky at room temperature in the dry form. There is no curing agent required in such systems, and they adhere without the need of more than finger or hand pressure. Further, pressure-sensitive adhesive systems require no activation by water, solvent, or heat. Other applications in which the present technology may be used include, for example, coatings and paints. Surfactant compositions of the present technology may improve or modify, for example, block resistance, adhesion, gloss, pigment dispersion, and blister resistance in paints, as well as water resistance in paints and coatings.

The present technology may also be used in conjunction with other emulsion polymer latexes, such as latexes with higher glass transition temperatures that are typically used in coating applications. Such latexes include, for example, acrylic, styrene-acrylic, and vinyl-acrylic compositions.

Surfactant Compositions

In some embodiments, surfactant compositions of the present technology achieve an effect similar to that of polymerizable surfactants through the use of branched surfactants, sterically bulky surfactants, or mixtures thereof. Surfactants suitable for use with the present technology include, but are not limited to, ionic and nonionic surfactants, and mixtures thereof. Ionic surfactants suitable for use with the present technology include, for example, cationic surfactants, anionic surfactants, and amphoteric surfactants.

Embodiments of surfactant compositions suitable for use with the present technology comprise at least one surfactant comprising a branched surfactant, a sterically bulky surfactant, or a mixture of branched and sterically bulky surfactants. In some embodiments, surfactant compositions comprise a sterically bulky ionic or sterically bulky nonionic surfactant.

In at least one embodiment, surfactant compositions suitable for use with the present technology comprise alkoxylated polyaryl substituted aromatic compounds or alkoxylated polyalkyl substituted aromatic compounds. Such compounds can be nonionic surfactants. Such compounds can also be ionic surfactants, such as being either anionic or cationic, when they are functionalized with an ionic moiety. Ionic moieties include, but are not limited to sulfate, sulfonate, phosphate, carboxylate, or alkyl ammonium. Counterions for anionic surfactants can be, for example, a proton, ammonium, alkylammonium, or mono or divalent metal salts. Counterions for cationic surfactants can be, for example, any anion, including hydroxide, fluoride, chloride, bromide or iodide.

In some embodiments of the present technology, surfactant compositions can comprise at least one sterically bulky nonionic surfactant. Examples of such surfactants include, but are not limited to, polyaryl alkoxylated aromatic compounds or polyalkyl alkoxylated aromatic compounds. More preferably, examples of such surfactants are polyaryl ethoxylated phenols and polyalkyl ethoxylated phenols. In a preferred embodiment, the surfactant composition comprises at least one alkoxylated polystyrylphenol, and more preferably comprises poly(ethylene oxide) polystyrylphenol. Poly(ethylene oxide) polystyrylphenol is also known as ethoxylated polystyrylphenol. Another term used for polystyrylphenol in this application is tristyrylphenol (TSP). Tristyrylphenol is a mixture of mono, di- and tri-styryl functionalized phenol and can have various molar designations. Any given molar designation is a mixture of molar compositions.

A preferred surfactant composition suitable for use with the present technology comprises ethoxylated polystyrylphenol having an ethylene oxide (EO) loading ranging from about 16 to about 40 moles of ethylene oxide per mole of ethoxylated polystyrylphenol, most preferably about 25 moles of ethylene oxide per mole of ethoxylated polystyrylphenol. However, it should be understood by those skilled in the art that polystyrylphenol of any varying molar designation is suitable for use in the practice of the presently described technology and is within the scope of the appended claims. For example, in alternative embodiments of the present technology the EO loading can range from about 0.1 moles to about 100 moles of ethylene oxide per mole of polystyrylphenol. The same range of EO loading is also envisaged for other surfactant compositions of the present technology.

Another preferred surfactant composition suitable for use with the present technology comprises sulfated ethoxylated polystyrylphenol (e.g., ethoxylated tristyrylphenol sulfate) having an ethylene oxide (EO) loading ranging from about 16 to about 40 moles of ethylene oxide per mole of ethoxylated polystyrylphenol. The counterion of the sulfate can be, for example, ammonium, sodium, or any other cation, or combination of cations.

Formula 1 below shows an idealized representation of tristyrylphenol. Formula 2 below shows an idealized representation of a sulfated $C_{1-2}$ alcohol with branching on the fifth carbon. Formula 3 below shows an idealized representation of sodium lauryl sulfate. In each of the formulas below, ethylene oxide groups and counter ions have been omitted.

Formula 1: Tristyrylphenol

Formula 2: Branched Sulfated $C_{12}$ Alcohol

Formula 3: Sodium Lauryl Sulfate

Other nonionic surfactants with bulky hydrophobes are also suitable for use with practice of the present technology. Such surfactants include, but are not limited to: polyalkylphenols, such as di-tert-butylphenols, tri-tert-butylphenols, di-octylphenols and trioctylphenols; other polyarylphenols, such as tribenzylphenol and trinapthylphenols; alkoxylated polyarylphenols, such as propoxylated tristyrylphenol; phenols with various degrees of substitution, such as monostyrylphenol, distyrylphenol, and mixtures thereof, hydroxy aromatic compounds, such as hydroxynaphthalene; substituted alkyl- and aryl hydroxy compounds, such as di-tert-butylnaphthalene and tristyrylnaphthalene; derivatives thereof and any mixture(s) thereof. In addition, ionic derivatives, including the Brønsted acids and bases, of these bulky hydrophobes, such as phosphate esters, sulfonates, sulfates, quaternary cations, and all salts thereof, are also sterically bulky and are suitable for use with the present technology.

In some embodiments, surfactant compositions comprise at least one branched or bulky ionic surfactant. Branched surfactants preferably have a high degree of branching. Without being bound by any particular theory, branching is believed to slow or otherwise mitigate the migration of the ionic surfactants. In some embodiments, the hydrophobe has a degree of branching greater than about 15%. In other embodiments, the hydrophobe has a degree of branching greater than about 20%. In yet other embodiments, the hydrophobe has a degree of branching greater than about 45%, or even greater than about 50%. In various embodiments, the average number of carbons making up the hydrophobe ranges from about 8 to about 22.

Some examples of branched ionic surfactants suitable for use in the practice of the present technology include, but are not limited to branched or bulky surfactant compounds, including, for example, sulfates, sulfonates, phosphates, and alkylammoniums, based on branched alcohols, including alkoxylated branched alcohols. Alkoxylated branched alcohols can be ethoxylated, or propoxylated. In some embodiments, branched ionic surfactants suitable for use in practice of the present technology are branched sulfates. It is preferred that branched sulfates comprise sulfates based on alkoxylated branched alcohols, and more preferably based on ethoxylated branched alcohol. One type of branched sulfate comprises alkyl sulfate, preferably a branched nominal-$C_{12}$ sulfate, which is more preferably a sulfated $C_{12}$ alcohol. One type of branched $C_{12}$ alcohol is available from Sasol Limited, of Johannesburg, South Africa, and has the tradename Safol®. The branching in Safol® alcohols arises from the method of manufacture, namely the Fischer-Tropsch OXO process. This route typically produces alcohols with approximately 50% branching. It is preferred that bulky sulfates comprise sulfates based on alkoxylated polyaryl substituted aromatic compound, and more preferably based on ethoxylated polystyrylphenol. One type of bulky sulfate comprises ethoxylated tristyrylphenol.

Other branched sulfates, such as tridecyl-sulfates, are also suitable for use with the present technology, such as those made from branched alcohols. Examples of commercially available branched alcohols include NEODOL® alcohols and EXXAL® alcohols. NEODOL® alcohols are alcohols made by Shell Chemicals Limited, of Houston, Tex., from petrochemical feeds, according to the modified OXO process, also known as hydroformulation or Roelen reaction. While sometimes marketed as a "linear" synthetic alcohol, NEODOL® alcohols can possess some degree of branching. For the purposes of this disclosure, they are considered lightly branched compared to naturally derived alcohols, which are considered linear. EXXAL® alcohols are alcohols made by Exxon Mobil Corporation, of Houston, Tex., from petrochemical feeds according to the OXO process. Because they are made according to the OXO synthesis, both NEODOL® alcohols and EXXAL® alcohols contain some degree of branching. Other sulfates suitable for use with the present technology include those made from secondary alcohols, including for example the Guerbet alcohols. Other bulky hydrophobes are also suitable for use with the present technology, such as alkyl-arylsulfates, as are ionic surfactants with ionic moieties other than sulfate, such as, for example sulfonate, phosphate, and ammonium.

In further embodiments, surfactant compositions suitable for use with the present technology comprise a mixture of an ionic surfactant and a nonionic surfactant. Ionic and nonionic surfactants can be chosen from any of those described above. In some embodiments such a mixture comprises at least one branched ionic surfactant and at least one sterically bulky nonionic surfactant. In some preferred embodiments, the surfactant composition comprises a mixture of at least one branched-alkyl sulfate and at least one ethoxylated polystyrylphenol. One example is a surfactant composition comprising branched alkane sulfate and ethoxylated tristyrylphenol. More particularly, at least one surfactant composition of the presently described technology can include a mixture of alkyl sulfate comprising sulfated branched $C_{1-2}$ alcohol and ethoxylated tristyrylphenol comprising 25 moles of ethylene oxide per mole of ethoxylated polystyrylphenol.

In a preferred embodiment, the surfactant use levels of ionic and nonionic surfactant are each greater than about 0.01 weight percent to about 7.5 weight percent based on the monomer content of the surfactant. Alternatively, the surfactant use levels of ionic and nonionic surfactant are each greater than about 0.01 weight percent to about 5.0 weight percent based on the monomer content of the surfactant.

More preferably, the amount of anionic surfactant is between about 0.05 weight percent to about 0.2 weight percent based on the monomer content of the anionic surfactant, and the amount of nonionic surfactant is between about 1.1 weight percent to about 1.3 weight percent based on monomer content of the nonionic surfactant. In another preferred embodiment of the present technology, the surfactant use levels of ionic and nonionic surfactant are from about 0.05 weight percent to about 0.2 weight percent based on the monomer content of at least one branched alkyl sulfate, and from about 1.1 weight percent to about 1.3 weight percent based on the monomer content of at least one ethoxylated polystyrylphenol.

It should also be appreciated by those skilled in the art that the latex compositions and water borne systems of the present technology can include a variety of additional components. For example, the compositions and systems may also comprise one or more pigments, coalescing agents, thickening agents and combinations thereof. Examples of pigments suitable in the practice of the present technology include titanium dioxide (Ti-Pure® R-746, commercially available from E.I. du Pont de Nemours and Company (Wilmington, Del.)), calcium carbonate, aluminum silicate, magnesium silicate, carbon black and iron oxide. Examples of suitable coalescing agents or solvents include, but are not limited to, Texanol (an ester alcohol commercially available from Eastman Chemical Company (Kingsport, Tenn.)), and glycol ethers. Examples of suitable thickening agents include, but are not limited to Acrysol™ SCT-275 (an associative type thickener commercially available from Rohm and Haas Company (Philadelphia, Pa.)), cellulosic thickeners such as hydroxylated cellulose and alkali soluble type thickeners.

Performance Characteristics

It has been surprisingly discovered that cast films of low glass-transition temperature ($T_g$) latexes made with branched-alkyl sulfates have greater optical clarity after exposure to water than those made with linear sodium lauryl sulfate (SLS). Similarly, films cast from latexes made with a mixture of branched-alkyl sulfate and sterically bulky ethoxylated polystyrylphenol (TSP) surfactants can show even greater optical clarity. The glass transition temperatures ($T_g$) of pressure sensitive adhesives with which the present technology is typically used depend somewhat on the particular application, but are generally about 30 to about 70° C. below the intended use temperature, or less than about (−)15° C. and preferably between about (−)60° C. and about (−)40° C. The glass transition temperature of individual components of pressure sensitive adhesives can range between about (−)90° C. to about 365° C. It will be appreciated by those skilled in the art that the glass transition temperature of the polymer latexes of the present technology will vary depending upon the end use or end application desired.

The glass transition temperatures of latexes used to formulate latex paints with which the present technology is typically used depend somewhat on the particular application, but are generally −20° C. to about 80° C., alternatively greater than about 5° C., and preferably between about 15° C. and about 80° C. In some embodiments, if the glass transition temperature of the paint coating is below about 15° C., blocking can occur. On the other hand, if the glass transition temperature is above about 80° C., the coating in accordance with some embodiments may be too brittle and susceptible to cracking.

It will be appreciated by those skilled in the art that the glass transition temperature may be measured using differential scanning calorimetry (DSC) when assessing the glass transition temperature of the present technology based upon the latex polymer. Alternatively, the expected glass transition temperature of a polymer can also be based on its composition. Thus, coating applications and/or compositions containing polymers that can exhibit a glass transition temperature between about 5° C. and about 80° C. exhibit minimum film-forming temperature (MFFT) (based upon the latex polymer, pigment, coalescing aides, etc.) of about 4° C. or greater. The MFFT is related to the glass transition temperature of the polymer, but is also affected by the other components of the formulation (e.g., coalescing aides, pigments, etc.). Thus, one skilled in the art will recognize that the glass transition temperature or MFFT of the present technology can be evaluated depending upon the polymer latexes of the present technology or the paints or other coating compositions of the present technology.

Without being bound to any specific theory, it is believed that the advantage of branched-alkyl sulfates over sodium lauryl sulfate derives from the sterically bulky branched-alkyl sulfates migrating more slowly than the linear, less hindered sodium lauryl sulfate. Similarly, the extremely bulky ethoxylated TSP also moves slowly through the latex. As a result of the attenuated migration, the surface of the latex film remains smoother and therefore shows less opacity.

Further, without being bound to any specific theory, it is also believed that the synergistic effect of branched-alkyl sulfate and TSP mixtures could arise because the emulsion polymers of the present technology exhibit the advantages of a combined anionic-nonionic surfactant system.

Performance data consisting of opacity and contact angle measurements (in degrees) on cast films of low $T_g$ latexes are believed to be related to surfactant migration, and can be used to analyze the effectiveness of surfactant compositions of the present technology. The results that have been achieved through the use of the present technology are unexpected because the detrimental effects of surfactants are thought to increase with surfactant loading. Conventional reasoning would dictate the material with the higher surfactant loading would be less water resistant. However, as can be seen in the test results below, when using the present technology, materials with larger amounts of sulfate have the higher contact angle (associated with increased hydrophobicity), and lower opacity upon exposure to water, also a sign of water resistance.

Another surprising discovery is that paint films made from latexes made with branched-alkyl sulfates of the present technology have greater wet-scrub resistance than those made with linear sodium lauryl sulfate (SLS). Similarly, paint films from latexes made with sterically bulky ethoxylated polystyrylphenol (TSP) surfactants also have superior wet-scrub resistance compared to linear sodium lauryl sulfate. Wet-scrub resistance is the ability to withstand cycles of the wet-scrub test (i.e., the number of needed to remove dried paint coating/film from an aged alkyd substrate in the presence of water). A quantitative method using digital image analysis allowed for the quantitative measurement of the percent coating removed for each coating tests to provide a relative wet-scrub resistance. Additionally, the wet-scrub resistance test can also be used to characterize the adhesion of the dried paint film in the presence of water. Further information regarding such testing can be found in ASTM D 2486.

Embodiments of the presently described technology are illustrated by the following examples, which are not to be construed as limiting the invention or scope of the specific procedures or compositions described herein. One skilled in the art will recognize that modifications may be made in the presently described technology without deviating from the spirit or scope of the invention. All levels and ranges, temperatures, results, etc., used and/or described herein are approximations unless otherwise specified.

EXAMPLES

Preparation of Latexes Used in Pressure Sensitive Adhesives
The following procedure is typical of the procedure that was used to prepare low $T_g$ latexes for testing:
In a 2-L round bottom flask, 0.5 g (0.1 weight % based on monomer (BOM)) of sodium bicarbonate, 200 g DI water, and 32 g (0.4 weight % BOM) of an acrylic seed latex (particle size ca 65 nm) were added. A monomer emulsion with the following formulation was prepared:
0.9-1.3 weight % BOM nonionic surfactant
0.05-0.2 weight % BOM anionic surfactant
0.3 weight % dioctyl sulfosuccinate, sodium salt
200 g deionized water The monomer composition comprised:
74 parts 2-ethylhexyl acrylate
10 parts butyl acrylate
15 parts methyl methacrylate
1 parts acrylic acid The kettle was charged to a temperature of 83° C. at a stirring rate of 150 rpm, under a nitrogen blanket. A 20 g solution of 0.38 weight % BOM initiator (ammonium persulfate) was added to the kettle, and the monomer emulsion was fed for 120 minutes. After 10 minutes of monomer addition, a 130 g solution of 0.38 weight % BOM ammonium persulfate was fed for 150 minutes. After completion of initiator feed, the temperature was held for 20 minutes before cooling to room temperature (approximately 25° C.). Samples were collected for particle size analysis at 60 minutes after the start of the monomer emulsion feed, 90 minutes after the start of the monomer emulsion feed, and after cooling. After latex cooled to less than about 50° C., it was neutralized with ammonium hydroxide to a pH between about 8.0 and about 8.5. The latex was filtered through 100 nm mesh. Latex solids were about 45 weight %, the final particle size was approximately 225 nm.

Preparation of Latexes Used in Paint Formulations of the Present Technology
The following procedure is typical of the procedure that was used to prepare high $T_g$ latexes for use as paint binders:
In a 2-L round bottom flask, 0.5 g (0.1 weight % based on monomer (BOM)) of sodium bicarbonate, 220 g DI water, and 30 g (2.2 weight % BOM on active basis) of a styrene-acrylic seed latex (particle size ca 50 nm) were added. A monomer emulsion with the following formulation was prepared:
0.0-0.65 weight % BOM nonionic surfactant
0.65-1.3 weight % BOM anionic surfactant
150 g deionized water
The monomer composition comprised:
20 parts styrene
44 parts butyl acrylate
34 parts methyl methacrylate
2 parts acrylic acid The kettle was charged to a temperature of 83° C. at a stirring rate of 150 rpm, under a nitrogen blanket. A 20 g solution of 0.2 weight % BOM initiator (ammonium persulfate) was added to the kettle, and the monomer emulsion was fed for 180 minutes. After 10 minutes of monomer addition, a 79 g solution of 0.5 weight % BOM ammonium persulfate and 0.5 weight % BOM sodium bicarbonate was fed for 180 minutes. After completion of monomer emulsion feed, the temperature was held for 60 minutes before cooling to room temperature (approximately 25° C.). After cooling the latex was neutralized with ammonium hydroxide to a pH between about 8.0 and about 8.5. The latex was filtered through 100 nm mesh. Latex solids were about 45 weight %, the final particle size was approximately 200 nm.

Semi-gloss Paint Formulation
The paint formulation shown in Table 1 was used to evaluate the performance of the surfactants used to produce the latexes used in the latex paint formulations. The paints were formulated using pre-dispersed titanium dioxide ($TiO_2$) from DuPont, Ti-Pure® R-746 at 76.5 weight % solids. Water was added to the mixing pigment followed by latex. The pH was adjusted to 8.1 with dilute ammonium hydroxide followed by the addition of Texanol coalescing solvent and stirred for 10 minutes. Acrysol™ SCT-275 thickener (17.5 weight % active) was added incrementally to the desired viscosity with mixing. The viscosity was allowed to stabilize overnight. Final Brookfield viscosities (No. 4 spindle at 12 rpm) were 3000±300 cps. A small amount of Kathon™ CG biocide was added and the paints were filtered through a 100 mesh screen. The resulting composition was a 48 weight % solids paint formulation, and the pigment volume concentration is 24%.

TABLE 1

| Component | Parts by Weight |
|---|---|
| $TiO_2$ | 22.9 |
| Water | 52.3 |
| Latex* | 21.3 |
| Texanol ® | 2.4 |
| SCT-275 | 1.1 |
| Total | 100 |

*Styrene-acrylic based on actives.

Wet-scrub Resistance Test Method for Latex Paint Coatings

This test is based on a modified version of ASTM D-2484. Paints were applied to aged alkyd panels using a 7 mil wet film applicator. The alkyd panels were prepared by coating tinted Glidden Ultra-Hide Alkyd Gloss Enamel onto black Leneta test panels and cured for four days at 50° C. The paints were coated in triplicate on separate alkyd panels and dried for seven days. The dried coatings were then cut using a straight edge blade into two inch wide panels. Two different panels were then placed towards the center of a mechanical scrub machine with a two inch separation between the panels. Eight grams of scrub compound as specified by ASTM D-2484 was applied to a 1.5×3.5 inch scrub brush and four grams of water applied between the two test panels. The scrub machine was started and run for however many cycles were needed. Digital images were produced at various stages of testing. Image analysis was then performed using Scion Imaging Software to quantitatively measure the amount of coating removed. The scrub tests were performed in triplicate and an average of the three measurements was recorded.

Contact Angle Measurements for Latex Paint Coatings

A 3.3 microliter water droplet was applied to paint films, and the contact angles were measured after 30 seconds. Measurements were performed on a Krüss goniometer. Contact angles were determined in triplicate (different coated panels). About nine measurements were made for each sample, and the average for each was recorded.

Blocking Resistance for Latex Paint Coatings

Block resistance was determined using a modified version of ASTM D-4946 in which 1 kg weight was applied to two 3.8 by 3.8-cm panels placed face to face under ambient conditions. A number eight stopper was placed between the weight and panel. The panels were pulled apart after for 24 hours. Block resistance was easy to determine for the samples; they blocked and delaminated or there was no blocking.

Brookfield Viscosity Determination

Viscosities were measured on a Brookfield DV-II+ Pro Viscometer using a number 4 LV spindle at 12 rpm. Values were taken after 30 seconds and measured in centipoises at 25±3° C. The target viscosity was about 3000±300 cps.

60° C. Blister Test

Figure 3:
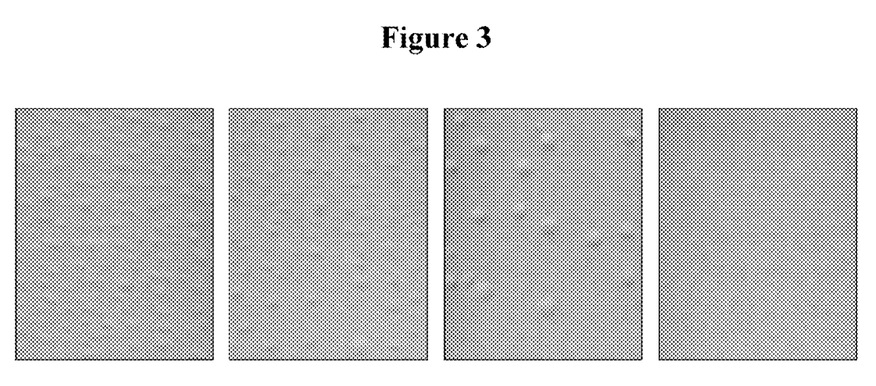
FIG. 3 illustrates paint coatings containing latexes made using different surfactants.

Paint coatings approximately 7 mil thick were applied to aged alkyd panels and dried for one week under ambient conditions. Approximately 1.5" square panels were placed in 60° C. deionized water and stored for one hour. The panels were removed and digital images were made so that a comparison of the degree blister formation could be determined. The results of the blister test are visual and qualitative as represented in FIG. 3.

Gloss Determination

The 20° gloss values were determined using a Gardner micro-gloss 20° gloss meter. Paint coating approximately 7 mil thick were applied to aged alkyd panels and dried for one week under ambient conditions. Ten readings were then taken for each panel. Three panels per paint sample were made. The 30 readings were then averaged together for each paint sample. The results can be seen in Table 5.

Opacity Testing

Latex films were prepared by drawing latex down on a clear polymer film to a wet film thickness of 2.4 mils. The films were dried in a 70° C. oven for 10 minutes and then cooled for one hour at room temperature. The films were then placed in a temperature controlled water bath at either 50° C. or 65° C. for 10 minutes. The films were then removed and protected with a sheet of clear polymer film. The films reflectance was measured against a white and black tile using a Hunter 45/0 Color Quest Colorimeter. The test was run in triplicate and a blank (non-water exposed) film was also measured. Reflectance measurements against the white and black tile were used to calculate opacity, as reflected in Table 3 below.

Contact Angle Measurements for Pressure Sensitive Adhesives

Latexes were drawn down in triplicate on glass microscope slides using a 1.0 mil wet drawdown bar. Latexes were dried in a 60° C. oven for 30 minutes, the slides were then removed and cooled to room temperature. The contact angle of the latex films were measured by using the Erma Contact Angle Meter G-1 equipped with a Rame-Hart automated pipette. The pipette was calibrated to deliver three microliters of deionized water per droplet. The droplets were applied to the film, and the contact angle was immediately read from the dial reader. A total of 15 droplets were measured to generate a standard error for the data. The measured contact angles are reported in Table 3 below.

Peel Strength Testing for Pressure Sensitive Adhesives

Latex films were prepared by drawing latex down on a heavy gauge aluminum foil sheet to a wet film thickness of 2.4 mils. The film was dried in a 70° C. oven for 10 minutes and then allowed to cure at ambient conditions for 2 hours. The film was then adhered to a sheet of clear polymer film. The prepared samples were stored in a humidity controlled room for at least 3 days before testing. The 180° (T-Peel) Peel Testing was conducted using a variant of ASTM Method D 1876-95. 1 inch wide strips were cut from the prepared samples after curing. At least five samples were pulled to obtain an average peel strength.

Experimental Results

Emulsion polymer latexes were formed and tested using various surfactant compositions. The emulsion polymers for evaluation in PSA application tests were formed of 2-ethylhexyl acrylate/butyl acrylate/methyl methacrylate/acrylic acid made with various surfactants. Table 2 is a description of the surfactant compositions.

TABLE 2

Surfactant Compositions

| # | Run | Factor 1 Nonionic Weight % | Factor 2 Anionic Weight % | EO Loading Moles | pH | Solids, Weight % | Coag, Weight % |
|---|---|---|---|---|---|---|---|
| 1 | Control: SLS | 0.00 | 0.20 | 0 | 8.36 | 45.13 | 0.0044 |
| 2 | Safol ®/SLS only | 0.00 | 0.20 | 0 | 8.28 | | |
| 3 | RUN 1 | 0.90 | 0.05 | 16 | 8.26 | 45.68 | 0.0019 |
| 4 | RUN 3 | 0.90 | 0.20 | 16 | 8.21 | 47.63 | 0.0043 |
| 5 | Control: TSP-16 | 1.30 | 0.00 | 16 | 8.28 | 45.64 | 0.1269 |
| 6 | RUN 5 | 1.30 | 0.05 | 16 | 8.31 | 45.40 | 0.0095 |
| 7 | RUN 2 | 1.30 | 0.20 | 16 | 8.34 | 45.61 | 0.0004 |
| 8 | TSP-25/Safol ® | 1.10 | 0.13 | 25 | 8.38 | | 0.0580 |
| 9 | TSP-25/SLS | 1.10 | 0.13 | 25 | 8.27 | | 0.0340 |
| 10 | RUN 8 | 0.90 | 0.05 | 40 | 8.24 | 44.65 | 1.3204 |
| 11 | RUN 6 | 0.90 | 0.20 | 40 | 8.22 | 43.95 | 0.3900 |
| 12 | RUN 7 | 1.30 | 0.05 | 40 | 8.38 | 44.13 | 0.4681 |
| 13 | RUN 4 | 1.30 | 0.20 | 40 | 8.36 | 43.07 | 0.2700 |

The designations and abbreviations utilized in Table 2 above are as follows: SLS designates sodium lauryl sulfate; TSP designates tristyrylphenol; TSP-16 designates tristyrylphenol with 16 moles of ethylene oxide per mole of ethoxylated tristyrylphenol; and designates tristyrylphenol with 25 moles of ethylene oxide per mole of ethoxylated tristyrylphenol.

After emulsion polymerization, the range of the nominal particle size was between about 200 and about 275 nanometers as measured by dynamic light scattering. Table 3 lists the testing results for contact angle and opacity. Opacity testing and contact angle testing were then done in accordance with the procedures described above.

TABLE 3

| # | Run | Contact Angle | Opacity 10 min in 50° C. H2O | Opacity 10 min in 65° C. H2O |
|---|---|---|---|---|
| 1 | Control-SLS | 53.0 | 11.59 | 17.50 |
| 2 | Safol ®-sulfate only | 53.7 | 4.46 | 13.52 |
| 3 | RUN 1 | 68.0 | 3.10 | 11.21 |
| 4 | RUN 3 | 77.0 | 5.12 | 5.83 |
| 5 | Control: TSP-16 | 68.3 | 4.75 | 8.69 |
| 6 | RUN 5 | 72.5 | 5.71 | 9.76 |
| 7 | RUN 2 | 72.7 | 5.15 | 5.62 |
| 8 | TSP-25/Safol ® | 66.7 | 1.88 | 4.57 |
| 9 | TSP-25/SLS | 62.9 | 8.35 | 9.80 |
| 10 | RUN 8 | 64.5 | 9.49 | 15.24 |
| 11 | RUN 6 | 65.6 | 7.09 | 18.32 |
| 12 | RUN 7 | 65.7 | 6.79 | 7.62 |
| 13 | RUN 4 | 65.5 | 4.49 | 7.78 |

The results reported above show that increasing opacity and decreasing contact angles are correlated with decreasing water resistance. For example, comparing lines 1 (polymer made with 0.2 weight % sodium lauryl sulfate) and 4 (polymer made with 1.35 weight % TSP-16, 0.2 weight % Safol® sulfate) indicates that the material with the larger amount of sulfate has the higher contact angle (associated with increased hydrophobicity), and lower opacity upon exposure to water, also a sign of water resistance.

Compared to the control latex made with sodium lauryl sulfate, the latexes in the Tables above made with Safol®E-sulfate, TSP-ethoxylate, or a combination of Safol®-sulfate and TSP-ethoxylate have lower opacity after 10 minutes of exposure to 50° C. water. With the exception of the latex made with 0.9 weight % 40-mole TSP ethoxylate and 0.2 weight % Safol®-sulfate, the examples above have lower opacity after 10 minutes of exposure to 65° C. water as compared to the control latex made with sodium lauryl sulfate. With the exception of the latex made with only Safol®-sulfate, the examples above have a higher contact angle as compared to the control latex made with sodium lauryl sulfate. While the latex made with only Safol®-sulfate has only a moderately higher contact angle than that of the control latex made with only sodium lauryl sulfate, the latex prepared with Safol®-sulfate out performs the latex made with sodium lauryl sulfate in opacity after exposure to both 50 and 65° C. water. The latex made with a combination of 25-mole TSP ethoxylate and Safol®-sulfate has lower opacity after exposure to both 50 and 65° C. water than the latex made with a combination of 25-mole TSP ethoxylate and sodium lauryl sulfate. Additionally, the latex made with a combination of 25-mole TSP ethoxylate and Safol®-sulfate displays the lowest opacities measured.

The results detailed in the above paragraph indicate that latexes made with TSP-ethoxylates, Safol®-sulfate, or combinations thereof display superior water resistance as measured by opacities and contact angle as compared to the control latex made with linear sodium lauryl sulfate. Based on the results above with respect to a combination of TSP-ethoxylate and Safol®-sulfate, it appears that the two components interact in a synergistic manner in the practice of the presently described technology.

Sodium lauryl sulfate is naturally derived and is overwhelmingly composed of linear isomers. Safol®-sulfate is branched and therefore posses a larger cross-sectional profile. TSP-ethoxylates have the largest cross-sectional profile of the three owing to the bulky styryl moieties attached to the central phenol group. Without being bound by any particular theory, it is believed that sodium lauryl sulfate migrates more rapidly through the film due to its smaller cross-sectional profile.

Moreover, the superior performance of the branched Safol®-sulfate and bulky TSP-ethoxylate over the linear sodium lauryl sulfate is further believed consistent with the theory that the linear sodium lauryl sulfate is able to migrate to the boundary of the latex film faster than the larger bulkier surfactants. Because the sodium lauryl sulfate would reach the water-latex interface the fastest, it would most readily leach out of the latex, resulting in poor water resistance. The branched and bulky Safol®-sulfate and TSP-ethoxylate would tend to be trapped in the latex and therefore would be less susceptible to water. Other film properties affected by interfacial phenomena such as adhesion and blocking could also be affected by having the mobility of residual surfactants in the latex attenuated.

Table 4 below summarizes the characterization of polymers used to make the paints characterized in this disclosure. The polymers were emulsion polymer of styrene/butyl acrylate/methacrylate/acrylic acid made with various surfactants as indicated in Table 4 below. All of the surfactants yielded good quality latexes as indicated by the negligible or low levels of coagulum. It is worth noting that all of the latexes have similar particle sizes. Since all of the polymers were made using identical monomer compositions and processing conditions, this indicates that any performance differences between the paints made with these polymers arises from the choice of surfactant. Moreover, it will be appreciated by those skilled in the art that the particle size of the latexes of the present technology can range from about 400 nm or less, more preferably about 250 nm or less. Additionally, the particle size can be determined using light scattering techniques known in the art.

TABLE 4

| Latex # | Surfactant A | % A | Surfactant B | % B | % coag. | PS |
|---|---|---|---|---|---|---|
| A | SLS | 0.65 | None | 0 | 0 | 200 |
| B | Safol sulfate | 0.65 | None | 0 | 0 | 185 |
| C | TSP-16 sulfate (1) | 1.3 | None | 0 | 0.34 | 209 |
| D | TSP-16 (1) sulfate | 0.65 | Safol Sulfate | 0.33 | 0 | 204 |
| E | TSP-16 sulfate (2) | 0.65 | None | 0 | 0.09 | 207 |
| F | TSP-16 PE (3) | 1.1 | None | 0 | 0.13 | 216 |

(1) Contains 50 molar equivalent % nonionic/50 molar equivalent % anionic.
(2) Fully sulfated tristyrylphenol with 16 moles of ethylene oxide.
(3) tristyrylphenol with 16 moles of ethylene oxide phosphate ester.

Table 5 below summarizes some of the performance data of paints made using the latexes A through F. It is clear that paints containing polymers made using different surfactants possess different performance properties. This is surprising given that the only difference between the coatings is the choice of surfactant used in the polymerization of the latex. The amounts of coating removed increases in the order of TSP<Safol sulfate<lauryl sulfate, with mixtures of Safol sulfate and TSP sulfate producing paints with adhesion close to that of Safol sulfate by itself. However, the two paints with the worst coating robustness were the paints that did not block nor had a reduced or prevented block. Although not wanting to be bound by any particular theory, it is believed that the coatings containing bulky TSP hydrophobes which all blocked (as can be seen in Table 5), suggests that the bulky surfactants do not migrate to the surface in sufficient amounts to inhibit blocking which also results in improved adhesion. This implies that the block resistance and wet-scrub resistance are complimentary properties. Table 5 shows the test data of latex paints, and the percent coating removed was determined after 200 cycles of the wet-scrub apparatus.

TABLE 5

| Latex Paint # | Block | Gloss | Contact angle | % Coating Removed |
|---|---|---|---|---|
| A | No | 37 | 62.7 | 47 |
| B | No | 50 | 69.4 | 15 |
| C | Yes | 21 | 74.4 | 6 |
| D | Yes | 34 | 70.9 | 15 |

TABLE 5-continued

| Latex Paint # | Block | Gloss | Contact angle | % Coating Removed |
|---|---|---|---|---|
| E | Yes | 19 | 74.1 | 6 |
| F | Yes | 33 | 74.1 | 9 |

Figure 1:
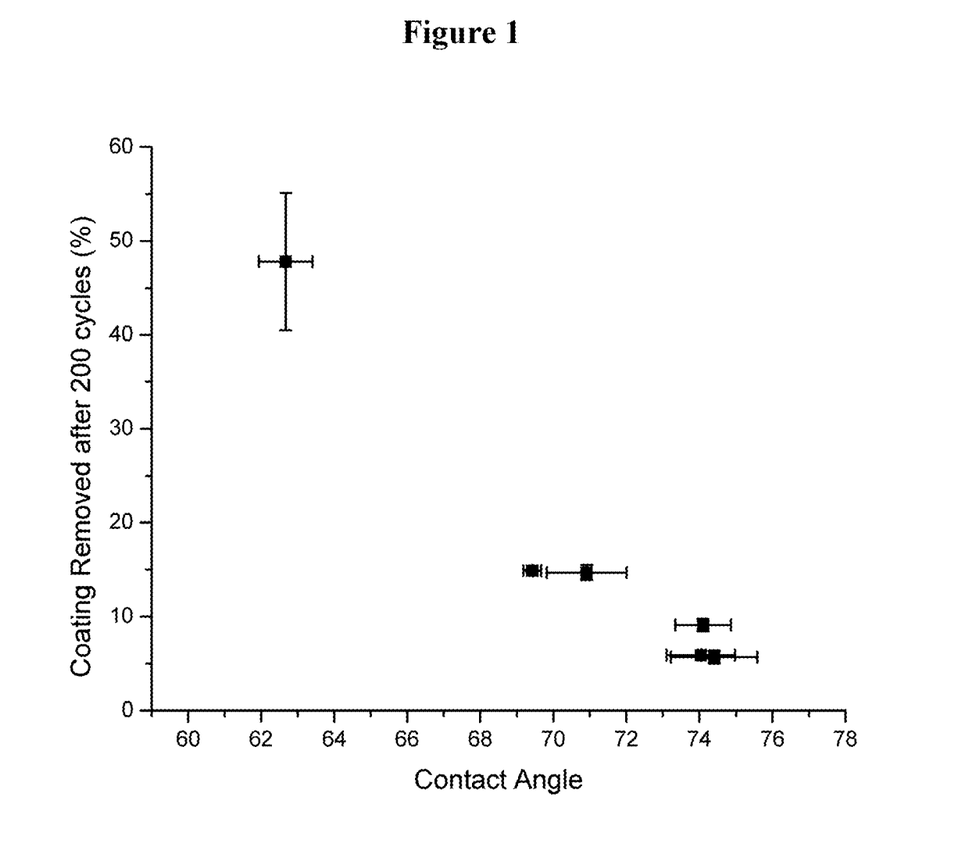
FIG. 1 is a plot showing the relationship between contact angle (as measured in degrees) and the amount of coating removed after 200 cycles.

FIG. 1 shows the relationship between the contact angle of water on paint coating and the amount of the coating removed after 200 cycles of the wet-scrub apparatus. The robustness of the film appears to increase with increasing contact angle.

Figure 2:
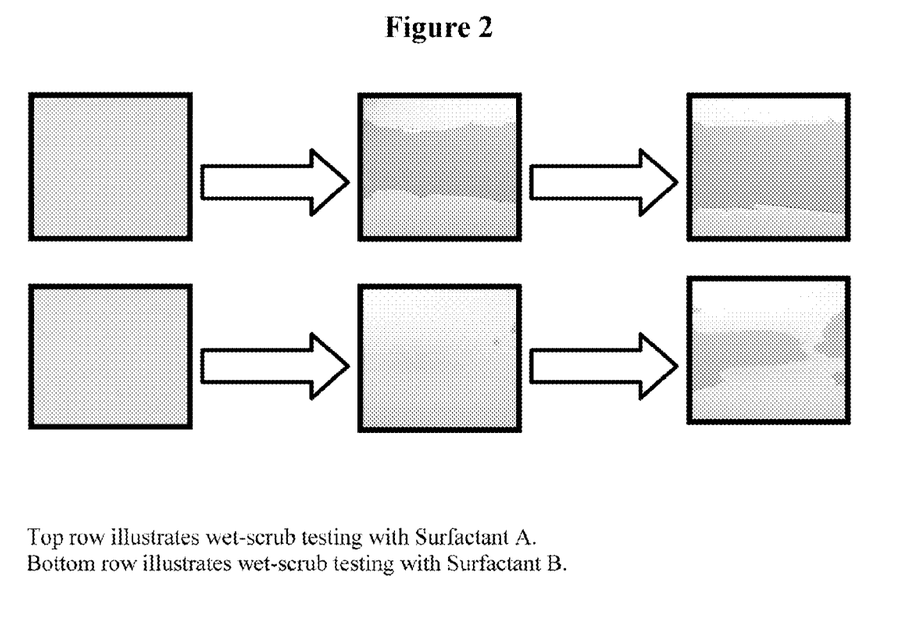
FIG. 2 illustrates wet-scrub testing performance results between paints from latexes made using surfactants A and B.

FIG. 2 demonstrates the difference seen in adhesion between paints from latexes made using surfactants A and B. Surfactant B, a branched surfactant, appears to produce films that adhere to the substrate much more strongly than films made using surfactant A, a linear surfactant.

FIG. 3 shows the effect of surfactant on the blister resistance of the film coatings. Blister resistance was evaluated based upon a relative comparison of the panels shown in the FIG. 3 for the differences in blister formation. As can be seen in FIG. 3, the morphology of the film changes across the series of linear to branched to bulky hydrophobe. The phosphate version of the bulky hydrophobe displays the best blister resistance. Additionally, FIG. 3 indicates that the SLS (linear) film has more blistering than the panels containing branched and bulky hydrophobes.

Figure 4:
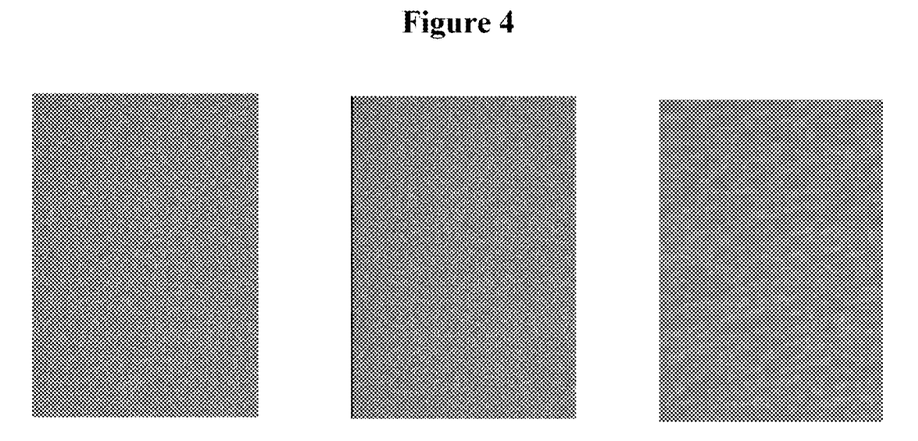
FIG. 4 illustrates microphotographs (400× magnification) of liquid paints containing latexes made using different surfactants.

FIG. 4 shows the pigment dispersion in paints. The linear and branched sulfates show better pigment dispersion than the TSP-based surfactant. As shown in FIG. 4, surfactants A and B show good pigment dispersion, while E shows poor pigment dispersion.

Figure 5:
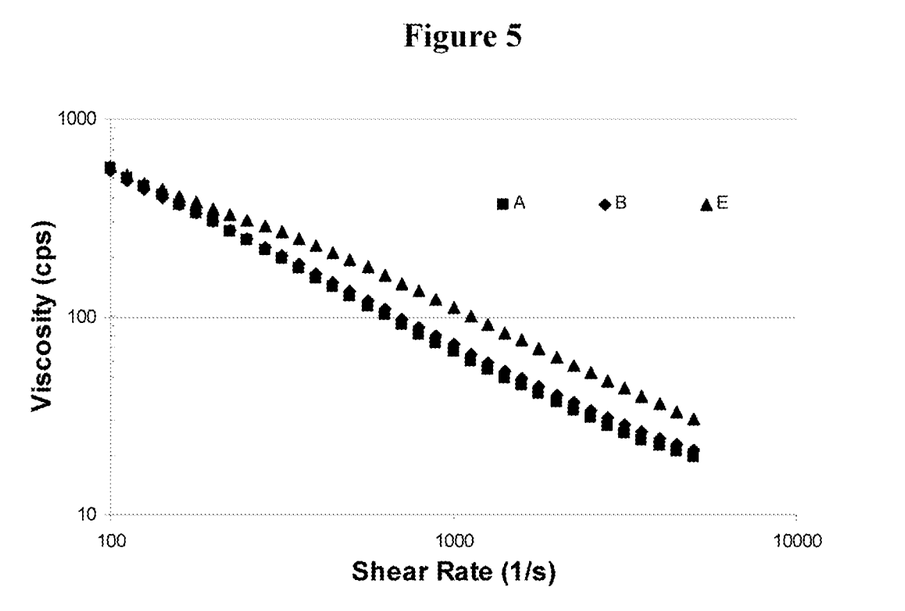
FIG. 5 illustrates the rheology of paints made with polymers using linear, branched, and TSP-based surfactants.

FIG. 5 shows the rheology of paints made latexes using various surfactants. The linear and branched surfactants show similar rheological profiles which are consistent with good pigment dispersion. The TSP-based surfactant is consistent with the poor pigment dispersion seen in the photomicrographs of FIG. 4.

Without being bound to any specific theory, the performance differences of the paints containing latexes made with different surfactants can be rationalized in terms the linear surfactant being able to migrate to the surface of the paint film more readily than either the branched or bulky TSP-based surfactants. The linear surfactant at the surface of the paint film interferes with adhesion to the substrate, thus resulting in the greater amount of coating removed as shown in Table 5. The branched and TSP-based surfactants, being larger, are trapped within the film and can not interfere with adhesion. The contact angles are also consistently higher for the paints containing latexes made using the branched and TSP-based surfactants. This is consistent with these two surfactants being trapped in the film and unable to affect the surface tension of the water drop. Films containing both the branched and TSP surfactants showed less blistering than films containing the linear surfactant, as shown in FIG. 3. This is consistent with the belief that larger surfactants interfere less with adhesion of the film to the substrate than would linear surfactants.

While the TSP surfactants appear to give poorer pigment dispersion, this does not necessarily negate their other performance advantages. It is worth noting that there are other technological solutions to this short coming. Blends of TSP surfactants with the branched surfactants show intermediate properties.

Table 6 below summarizes compositional make-up and performance outcomes for control latex formulations utilizing a linear surfactant (e.g., "Control-SLS") and latex formulations of the present technology containing at least one branched surfactant (e.g., "Formula 1 EHA Latex"). The make-up of Formula 1 EHA Latex is 74% 2-EHA (2-ethylhexyl acrylate)/10% BA (butyl acrylate)/15% MMA (methylmethacrylate)/1% AA (acrylic acid).

Figure 6:
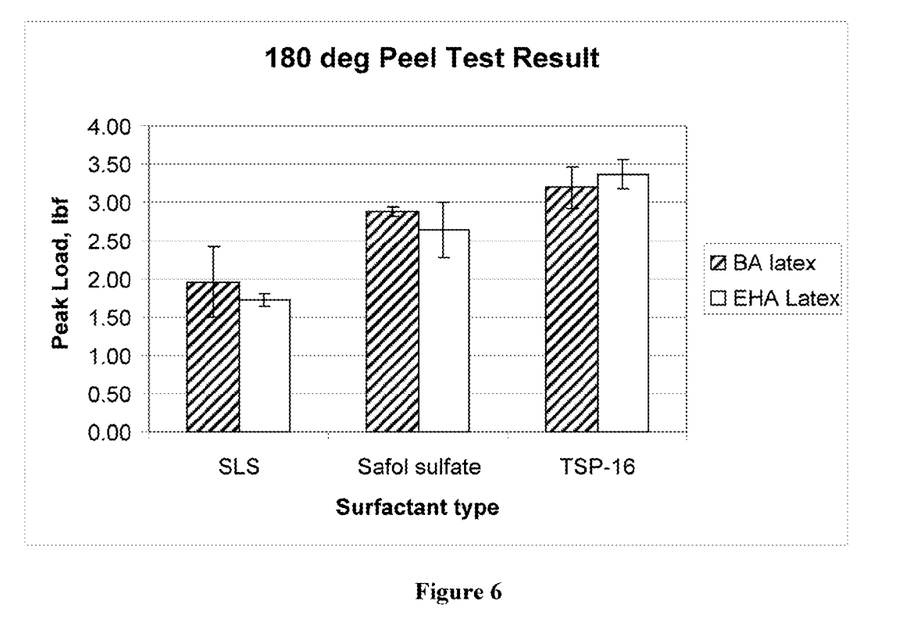
FIG. 6 illustrates the peel strength results with polymers using linear, branched, or TSP-based surfactants.

For additional comparative purposes, the previous Runs (e.g., 1, 2, 3, and 5) of the present technology have also been included. As can be seen in Table 6 below, each of the control, Safol-sulfate and Run formulations were prepared and analyzed utilizing nonionic and anionic Factors 1 and 2, respectively. Further, the contact angle, change in opacity within water heated to approximately 50° C. and 65° C., and peel strength were evaluated for each of the formulations. As the results demonstrate and the information presented in FIG. 6, the Safol-sulfate and Runs (i.e., branched surfactant) latex formulations of the present technology unexpectedly and surprisingly exhibited a stronger peel strength than those conventional formulations utilizing linear surfactants.

Moreover, the latex formulations of the present technology also exhibited a slower change in opacity over time in increased temperature conditions than those formulations containing linear surfactants. Thus, the formulations of the present technology exhibit improved properties that offer potential commercial benefits.

For example, in the bottling industry, the longer time for an adhesive to opacify (i.e., haze or turn cloudy) is preferred in the hopes that the adhesive will not discolor packaging and labeling. The latex formulations of the present technology utilizing branched surfactants exhibit longer change in opacity times over a range of temperature gradients than conventional formulations utilizing linear surfactants. As a result, the opacity of labeling or advertising materials adhesively placed upon the bottle or packaging material utilizing the formulations of the present technology is reduced or prevented. Clear labeling allows the consumer to receive an aesthetically pleasing product and one that allows for clear reading of labeling information.

Although not wanting to be bound by any particular theory, it is believed that the latex formulations of the present technology exhibit a reduced change in opacity over time across temperature gradients because the branched surfactants within the formulations migrate more slowly to the surface of such compositions than those formulations utilizing linear surfactants.

TABLE 6

Nonionic Makon TSP-16 or Makon TSP-40
Anionic Safol Sulfate, Na
SLS, POLYSTEP B-5

| # | Run | Factor 1, Nonionic Wt % | Factor 2, Anionic Wt % | EO Loading Moles | pH | Solids, % | % Grit, BOM |
|---|---|---|---|---|---|---|---|
| 1 | Control-SLS | 0 | 0.2 | 0 | 8.36 | 45.13 | 0.004 |
| 2 | Safol-sulfate | 0 | 0.2 | 0 | 8.28 | 45.05 | 0.079 |
| 6 | 1 | 0.9 | 0.05 | 16 | 8.26 | 45.68 | 0.002 |
| 7 | 3 | 0.9 | 0.2 | 16 | 8.21 | 47.63 | 0.004 |
| 8 | Control-TSP 16 | 1.3 | 0 | 16 | 8.28 | 45.64 | 0.127 |
| 9 | 5 | 1.3 | 0.05 | 16 | 8.31 | 45.4 | 0.010 |
| 10 | 2 | 1.3 | 0.2 | 16 | 8.34 | 45.61 | 0.000 |
| 11 | TSP-25/Safol | 1.1 | 0.13 | 25 | 8.38 | 44.65 | 0.058 |
| 12 | TSP-25/SLS | 1.1 | 0.13 | 25 | 8.27 | 44.13 | 0.034 |
| 16 | 8 | 0.9 | 0.05 | 40 | 8.24 | 44.65 | 1.320 |
| 17 | 6 | 0.9 | 0.2 | 40 | 8.22 | 43.95 | 0.390 |
| 18 | 7 | 1.3 | 0.05 | 40 | 8.38 | 44.13 | 0.468 |
| 19 | 4 | 1.3 | 0.2 | 40 | 8.36 | 43.07 | 0.270 |

| # | Run | Contact Angle | ΔOpacity 10 min in 50 C. H2O | ΔOpacity 10 min in 65 C. H2O | 180° deg peel testing-Peak load, lbf |
|---|---|---|---|---|---|
| 1 | Control-SLS | 53 | 11.59 | 17.5 | 1.72 |
| 2 | Safol-sulfate | 53.7 | 4.46 | 13.52 | 2.65 |
| 6 | 1 | 68 | 3.1 | 11.21 | 3.28 |
| 7 | 3 | 77 | 5.12 | 5.83 | 3.71 |
| 8 | Control-TSP 16 | 68.3 | 4.75 | 8.69 | 3.37 |
| 9 | 5 | 72.5 | 5.71 | 9.76 | 2.41 |
| 10 | 2 | 72.7 | 5.15 | 5.62 | 3.31 |
| 11 | TSP-25/Safol | 66.7 | 1.88 | 4.57 | 2.35 |
| 12 | TSP-25/SLS | 62.9 | 8.35 | 9.8 | 2.106 |
| 16 | 8 | 64.5 | 9.49 | 15.24 | 2.05 |
| 17 | 6 | 65.6 | 7.09 | 18.32 | 2.81 |
| 18 | 7 | 65.7 | 6.79 | 7.62 | 2.73 |
| 19 | 4 | 65.5 | 4.49 | 7.78 | 2.54 |

Table 7 below summarizes compositional make-up and performance outcomes for control latex formulations utilizing a linear surfactant (e.g., "Control-SLS") and varying monomer content latex formulations of the present technology containing at least one branched surfactant (e.g., "Formula 2 BA Latex"). The make-up of Formula 2 BA Latex of the present technology is 98% BA (butyl acrylate) and 2% AA (acrylic acid).

For additional comparative purposes, the previous Runs (e.g., 1, 2, 3 and 5) of the present technology have also been included. As can be seen in Table 7 below, each of the control, Safol-sulfate and Run formulations were prepared and analyzed utilizing nonionic and anionic Factors 1 and 2, respectively. Further, the contact angle, change in opacity within water heated to approximately 50° C. and 65° C., and peel strength were evaluated for each of the formulations. As the results demonstrate and the information presented in FIG. 6, the Safol-sulfate and Runs (i.e., branched surfactant) latex formulations of the present technology having varied monomer content and/or make-up unexpectedly and surprising exhibit a stronger peel strength than those conventional formulations utilizing linear surfactants.

Moreover, the latex formulations of the present technology also exhibited a slower change in opacity over time in increased temperature conditions than those formulations containing linear surfactants. Again not wanting to be bound by any particular theory, it is believed that the results presented in Table 7 demonstrate how latex formulations of the present technology exhibit improved change in opacity over time and temperature performance as well as improved peel strength performance based upon the utilization of a branched surfactant rather than the monomer content or make-up. Additionally, such results indicate that the formulations of the present technology exhibit improved properties that offer potential commercial benefits over that of previously utilized latex formulations containing linear surfactants.

TABLE 7

Nonionic Makon TSP-16 or Makon TSP-40 Seed latex
Anionic Safol Sulfate, Na
SLS, POLYSTEP B-5
Latex Comp: 98% BA/2% AA TSP DOE with Safol Sulfate

| # | Run | Factor 1, Nonionic Wt % | Factor 2, Anionic Wt % | EO Loading Moles | pH | Solids, % | % Grit, BOM |
|---|---|---|---|---|---|---|---|
| 1 | Control-SLS | 0 | 0.2 | 0 | 8.25 | 56.54 | 0.11 |
| 2 | Safol Sulfate | 0 | 0.2 | 0 | 8.31 | 48.14 | 0.04 |
| 3 | Neodol 25 | 0 | 0.2 | 0 | 8.2 | 46.24 | 0.18 |
| 6 | RUN 1 | 0.9 | 0.05 | 16 | 8.28 | 45.23 | 0.14 |
| 7 | RUN 3 | 0.9 | 0.2 | 16 | 7.87 | 45.55 | 0.11 |
| 8 | Control-TSP 16 | 1.3 | 0 | 16 | 8.4 | 50.63 | 0.19 |
| 9 | RUN 5 | 1.3 | 0.05 | 16 | 8.1 | 46.43 | 0.20 |
| 10 | RUN 2 | 1.3 | 0.2 | 16 | 7.64 | 48.48 | 0.10 |
| 11 | TSP25/Safol | 1.1 | 0.13 | 25 | 7.94 | 49.09 | 0.14 |
| 12 | TSP-25/SLS | 1.1 | 0.13 | 25 | 7.81 | 46.01 | 0.35 |
| 13 | TSP-25/Neodol 25 | 1.1 | 0.13 | 25 | 8.1 | 55.07 | 0.20 |
| 16 | RUN 8 | 0.9 | 0.05 | 40 | 8.3 | 49.68 | 0.07 |
| 17 | RUN 6 | 0.9 | 0.2 | 40 | 8.3 | 46.03 | 0.49 |
| 18 | RUN 7 | 1.3 | 0.05 | 40 | 8.5 | 49.85 | 0.18 |
| 19 | RUN 4 | 1.3 | 0.2 | 40 | 8.5 | 47.14 | 0.12 |

| # | Run | Contact Angle | ΔOpacity 10 min in 50 C. H20 | ΔOpacity 10 min in 65 C. H20 | 180° deg peel testing-Peak load, lbf |
|---|---|---|---|---|---|
| 1 | Control-SLS | 61.5 | 7.35 | 11.18 | 1.97 |
| 2 | Safol Sulfate | 65.8 | 7.86 | 13.85 | 2.89 |
| 6 | RUN 1 | 67.3 | 14.22 | 22.49 | 3.47 |
| 7 | RUN 3 | 68.4 | 18.75 | 27.64 | 1.97 |
| 8 | Control-TSP 16 | 66.6 | 7.66 | 11.29 | 3.20 |
| 9 | RUN 5 | 67.5 | 18.64 | 26.04 | 1.99 |
| 10 | RUN 2 | 69.3 | 5.80 | 9.98 | 2.75 |
| 11 | TSP25/Safol | 68.8 | 8.63 | 13.48 | 2.31 |
| 12 | TSP-25/SLS | 68.5 | 11.71 | 17.22 | 2.78 |
| 16 | RUN 8 | 68.4 | 10.67 | 15.41 | 2.63 |
| 17 | RUN 6 | 69 | 3.74 | 7.03 | 2.14 |
| 18 | RUN 7 | 66 | 11.42 | 12.85 | 1.67 |
| 19 | RUN 4 | 62.5 | 9.52 | 13.74 | 2.60 |

The presently described technology and the manner and process of making and using it, are now described in such full, clear, concise and exact terms as to enable one of ordinary skill in the art to which the present technology pertains, to make and use the same. It should be understood that the foregoing describes some embodiments and advantages of the invention and that modifications may be made therein without departing from the spirit and scope of the presently described technology as set forth in the claims. Moreover, the invention has been described with reference to preferred and alternate embodiments. Modifications and alterations will occur to others upon the reading and understanding of the specification. It is intended to include all such modifications and alterations insofar as they come within the scope of the appended claims or equivalents thereof. To particularly point out and distinctly claim the subject matter regarded as the invention, the following claims conclude this specification.

What is claimed is:

1. A paint composition comprising:
   a. an emulsion polymer latex composition obtained from a monomer emulsion, wherein the monomer emulsion comprises:
      (i) at least one surfactant selected from the group consisting of tristyrylphenol, ethoxylated tristyrylphenol, functionalized tristyrylphenol, and functionalized ethoxylated tristyrylphenol, wherein the functional group is sulfate, sulfonate, phosphate, carboxylate or alkyl ammonium; and
      (ii) synthetic monomers selected from the group consisting of vinyl aromatic monomers, methacrylic acid monomers, acrylate monomers, ester methacrylate monomers, and combinations thereof, in combination with acrylic acid present in an amount of about 2 parts by weight per one hundred parts total monomer; and
   b. water,
   wherein the paint composition has improved adhesion and blister resistance.

2. The paint composition of claim 1, wherein the at least one surfactant is sulfated tristyrylphenol.

3. The paint composition of claim 2, wherein the sulfated tristyrylphenol is an ethoxylated tristyrylphenol sulfate.

4. The paint composition of claim 3, wherein the ethoxylated tristyrylphenol sulfate has an ethylene oxide loading ranging from about 0.1 to about 100 moles of ethylene oxide per mole of ethoxylated tristyrylphenol.

5. The paint composition of claim 3, wherein the ethoxylated tristyrylphenol sulfate has an ethylene oxide loading ranging from about 16 to about 40 moles of ethylene oxide per mole of ethoxylated tristyrylphenol.

6. The paint composition of claim 1, wherein the monomer emulsion further comprises at least one branched sulfated alcohol surfactant.

7. A paint composition having improved adhesion and blister resistance comprising:
   a. at least one emulsion polymer latex composition obtained from a monomer emulsion, wherein the monomer emulsion comprises:
      (i) at least one surfactant selected from the group consisting of branched alcohol surfactants, tristyrylphenol, ethoxylated tristyrylphenol, functionalized tristyrylphenol, and functionalized ethoxylated tristyrylphenol, wherein the functional group is sulfate, sulfonate, phosphate, carboxylate or alkyl ammonium; and
      (ii) synthetic monomers selected from the group consisting of vinyl aromatic monomers, methacrylic acid monomers, ester acrylate monomers, ester methacrylate monomers, and combinations thereof, in combination with acrylic acid present in an amount of 1 to 2 parts by weight per one hundred parts total monomer; and
   b. water;
   wherein the paint composition is substantially free of linear surfactants.

8. The paint composition of claim 7, wherein the at least one branched alcohol surfactant is at least one branched sulfated alcohol.

9. The paint composition of claim 8, wherein the at least one surfactant is a combination of at least one branched sulfated alcohol, at least one ethoxylated tristyrylphenol and at least one ethoxylated tristyrylphenol sulfate.

10. The paint composition of claim 7, wherein the at least one surfactant is a combination of at least one ethoxylated tristyrylphenol and at least one ethoxylated tristyrylphenol sulfate.

11. The paint composition of claim 7, wherein the at least one surfactant is at least one ethoxylated tristyrylphenol phosphate ester.

12. The paint composition of claim 7, wherein the at least one emulsion polymer latex composition exhibits a particle distribution size of about 400 nm or less.

13. The paint composition of claim 12, wherein the at least one emulsion polymer latex composition exhibits a particle distribution size of less than about 250 nm.

14. The paint composition of claim 7, wherein the at least one emulsion polymer latex composition exhibits a glass transition temperature between about −20° C. to about 80° C.

15. The paint composition of claim 7, wherein the at least one emulsion polymer latex composition exhibits a glass transition temperature of greater than about 5° C.

16. The paint composition of claim 7, wherein the at least one emulsion polymer latex composition exhibits a glass transition temperature between about 5° C. and about 80° C.

17. The paint composition of claim 7, wherein the composition further comprises at least one pigment, at least one coalescing agent, and at least one thickening agent.

* * * * *

UNITED STATES PATENT AND TRADEMARK OFFICE
CERTIFICATE OF CORRECTION

| | | |
|---|---|---|
| PATENT NO. | : 8,492,465 B2 | Page 1 of 1 |
| APPLICATION NO. | : 12/243626 | |
| DATED | : July 23, 2013 | |
| INVENTOR(S) | : Jean M. Seibold et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 485 days.

Signed and Sealed this
Tenth Day of February, 2015

Michelle K. Lee
*Deputy Director of the United States Patent and Trademark Office*